(12) United States Patent
Oldeide

(10) Patent No.: US 12,736,130 B2
(45) Date of Patent: Sep. 15, 2026

(54) GEAR SHIFT ACTUATOR

(71) Applicant: Kongsberg Automotive Holding 2 AS, Kongsberg (NO)

(72) Inventor: Christer Kobbevik Oldeide, Kongsberg (NO)

(73) Assignee: KONGSBERG AUTOMOTIVE HOLDING 2 AS, Konsberg (NO)

( * ) Notice: Subject to any disclaimer, the term of this patent is extended or adjusted under 35 U.S.C. 154(b) by 0 days.

(21) Appl. No.: 19/127,145

(22) PCT Filed: Jun. 30, 2023

(86) PCT No.: PCT/EP2023/068096
§ 371 (c)(1),
(2) Date: May 5, 2025

(87) PCT Pub. No.: WO2025/002583
PCT Pub. Date: Jan. 2, 2025

(65) Prior Publication Data

US 2026/0153146 A1 Jun. 4, 2026

(51) Int. Cl.

| | |
|---|---|
| ***F16H 63/18*** | (2006.01) |
| ***F16H 61/28*** | (2006.01) |
| ***F16H 61/32*** | (2006.01) |
| ***F16H 63/30*** | (2006.01) |

(52) U.S. Cl.
CPC ............. *F16H 63/18* (2013.01); *F16H 61/32* (2013.01); *F16H 2061/2869* (2013.01); *F16H 2063/3079* (2013.01); *F16H 2063/3089* (2013.01)

(58) Field of Classification Search
CPC .......... F16H 63/18; F16H 63/32; F16H 61/32; F16H 2061/2869; F16H 2063/3079; F16H 2063/3089; F16H 2063/321
See application file for complete search history.

(56) References Cited

U.S. PATENT DOCUMENTS

| | | | | |
|---|---|---|---|---|
| 8,402,859 | B2 | 3/2013 | Neelakantan et al. | |
| 9,556,958 | B2 * | 1/2017 | Tsukamoto | F16H 63/38 |
| 10,982,765 | B2 * | 4/2021 | Maki | F16H 63/32 |
| 2015/0107955 | A1 | 4/2015 | Trönnberg | |
| 2018/0135751 | A1 | 5/2018 | Maki | |
| 2022/0299110 | A1 | 9/2022 | Rosinski | |

FOREIGN PATENT DOCUMENTS

| | | |
|---|---|---|
| WO | 2023165705 A1 | 9/2023 |

OTHER PUBLICATIONS

International Search Report and Written Opinion mailed Jan. 17, 2024 in PCT/EP2023/068096; 14 pages.

* cited by examiner

*Primary Examiner* — Jake Cook

(74) *Attorney, Agent, or Firm* — CANTOR COLBURN LLP

(57) ABSTRACT

A gear shift actuator has a linear drive assembly including a driven component configured to actuate a shift fork; a rotary member which is supported to be rotatable, but unmovable in an axial direction defined by a rotary axis of the rotary member, and an electric motor configured to rotate the rotary member. The driven component is driven by rotary movement of the rotary member for linear movement parallel to the axial direction in a first direction from a neutral position to a first gear engaged position and back to neutral, when the rotary member is driven to rotate first in a first rotational direction and then in a second rotational direction opposite to the first rotational direction.

20 Claims, 11 Drawing Sheets a)
b)
c)
d)

GEAR SHIFT ACTUATOR

CROSS-REFERENCE TO RELATED APPLICATIONS

This application is a National Stage application of PCT/EP2023/068096 filed Jun. 30, 2023, the disclosure of which is incorporated herein by reference in its entirety.

BACKGROUND

The present invention relates generally to a gear shift actuator.

SUMMARY

One or more embodiments of the present disclosure is directed to a gear shift actuator comprising a linear drive assembly for actuating a shift fork by a driven component thereof and comprising: a rotary member which is supported to be rotatable, but unmovable in an axial direction defined by its rotary axis, an electric motor for rotating the rotary member, and the driven component driven by rotary movement of the rotary member for linear movement parallel to the axial direction in a first direction from a neutral position to a first gear engaged position and back to neutral, when the rotary member is driven to rotate first in a first rotational direction and then in a second rotational direction opposite to the first rotational direction, and in a second direction opposite to the first direction from the neutral position to a second gear engaged position and back to neutral, when the rotary member is first driven to rotate in the second rotational direction and then in the first rotational direction.

Gear shift actuators are utilized in motor vehicles to shift transmission between two coaxially disposed, rotary shafts between a gear engaged position in which rotary engagement between the two shafts is established and torque transmission takes place, and a neutral, disengaged position, in which the two rotary shafts are decoupled from each other. A typical case of application for a gear shift actuator of the above-described type is an actuator for a dog clutch. A dog clutch is a mechanism for connecting and disconnecting two rotating shafts. It is based on the working principle to let a set of regularly spaced teeth or protrusions on one wheel connected to one of the shafts engage with a set of complementary recesses between teeth on another wheel connected to the second shaft. When the two wheels are moved together such that the teeth of the first wheel are received in the recesses formed between teeth of the second wheel a slip-free rotary engagement between the shafts is established. A dog clutch with a dog clutch actuator is for example described in US 2015/0107955 A1. A gear shift actuator comprises a linear drive assembly having a rotary member in the form of a lead screw which is supported to be rotatable, but not moveable in the direction of its rotary axis, an electric motor for rotating the lead screw, and a driven component in the form of a nut engaged by the lead screw. By engagement of nut and lead screw rotary movement of the lead screw is transmitted into a linear movement of the nut along the axial direction of the rotary axis of the lead screw. The driven component in form of the nut is connected to a shift fork for driving it from a neutral position to a gear engaged position and vice versa, when the lead screw is driven to rotate in a first rotational direction and in a second rotational direction opposite to the first rotational direction, respectively. In the neutral position of the shift fork one of the teeth carrying wheels is moved away from the other so that the torque-transmitting engagement between the two wheels is ceased. By moving the shift fork using the linear drive assembly to the gear engaged position the one of the two teeth or dog wheels is moved into rotary engagement with the teeth of the other wheel, wherein the teeth of one wheel are received in the recesses between the teeth of the other wheel and vice versa.

For such gear shift actuators the situation may arise that the two teeth or dog wheels are in a relative angular position with respect to each other such that the teeth of one wheel are facing directly opposite teeth of the other wheel, in which case the gear shift actuator cannot shift to the gear engaged position until the dog wheels have rotated relative to each other so that the dogs of one wheel are aligned with recesses between dogs of the other wheel.

One or more embodiments of the present disclosure provides a gear shift actuator designed such that it can deal with situations in which a shift fork to be actuated by the gear shift actuator is temporarily blocked in a simple and reliable manner.

One or more embodiments of the present disclosure is directed to a gear shift actuator comprising a linear drive assembly for actuating a shift fork by a driven component thereof. The linear drive assembly comprises: a rotary member which is supported to be rotatable, but unmovable (in the rest frame of the transmission to be actuated) in an axial direction defined by its rotary axis, an electric motor for rotating the rotary member, and the driven component driven by rotary movement of the rotary member for linear movement parallel to the axial direction. The linear drive assembly is configured such that this linear movement is effected in a first direction from a neutral position to a first gear engaged position of the driven member and back to neutral, when the rotary member is driven to rotate first in a first rotational direction and then in a second rotational direction opposite to the first rotational direction; and such that this linear movement is effected in a second direction opposite to the first direction from the neutral position to a second gear engaged position and back to neutral, when the rotary member is first driven to rotate in the second rotational direction and then in the first rotational direction.

According to one or more embodiments, the rotary member is a shaft which is in engagement with a first and a second barrel cam, wherein the shaft and the first and second barrel cams are configured such that their engagement is torque-prove, whereas the first and second barrel cams are free to slide in axial direction along the shaft. Such engagement can for example be realized by a shaft having a non-circular cross-section, when the shaft is received in throughgoing openings in the first and second barrel cams which have a complementary cross-sectional shape; according to one or more embodiments, the shaft is a splined shaft which is in engagement with a complementary shaped openings in the first and second barrel cams. The first and second barrel cams are disposed between spaced apart first and second end stops which are fixed in axial direction to limit axial movement of the first and second barrel cams, respectively, along the shaft. A spring mechanism is disposed between the first and second barrel cams to bias them apart and towards the first and second end stops, respectively.

The first and second barrel cams comprise first and second cam grooves on their surfaces, respectively, and the driven component carries corresponding first and second cam followers spaced apart in axial direction and arranged to be received in the first and second cam grooves, respectively.

Each of the first and second cam grooves extends from a starting point along a circumferentially extending start portion which is followed by a helical portion extending further towards an outer end portion of the respective one of the first and second barrel cams, i.e. the helical portion of each of the first and second barrel cams is turning away from the other one of the first and second barrel cams. The helical portion is continued by a circumferentially extending end portion in each of the first and second cam grooves.

The starting points of the first and second cam grooves are open to recessed surface sectors of the first and second barrel cams, respectively, which allow movement of the first and second cam followers, respectively, in a direction parallel to the axial direction in a region between the first and second cam grooves, respectively, and an inner end portion of the first and second barrel cam remote from the first and second cam grooves. The first and second barrel cams are rotationally oriented with respect to each other such that the starting portions of the first and second cam grooves are aligned and overlapping so that, when the first cam follower is in the starting portion of the first cam groove the second cam follower is in the starting portion of the second cam groove, so that when the rotary member in this state

- is rotated in the first rotational direction the first cam groove is moved along the first cam follower which thereby is driven by its helical portion to move the driven component in the first direction, while the second cam follower is free to follow this movement in the recessed surface portion of the second barrel cam,
- is rotated in the second rotational direction the second cam groove is moved along the second cam follower which thereby is driven by the helical portion to move the driven component in the second direction, while the first cam follower is free to follow this movement in the recessed surface portion of the first barrel cam.

With this design, the gear shift actuator can deal with situations in which the driven component (typically a push rod) is acting against a blocked clutch. In the case of a blockage, the push rod acts against the blocked clutch and can therefore not perform any linear movement. If the rotary member is rotated in this state, the respective one of the first and second barrel cams has to perform the desired but blocked linear movement in opposite direction which moves the respective one of the first and second barrel cams away from its associated end stop; due to this movement of the respective one of the first and second barrel cams towards closer to the opposite one of the first and second barrel cams the spring mechanism acting between them is compressed. In other words the driving energy of the linear drive assembly is in the case of a completely blocked clutch stored in the compressed spring, and after the blockage of the clutch is resolved the spring mechanism expands thereby driving the driven component for the desired linear movement when the respective one of the first and second barrel cams is moved by the expanding spring mechanism back to abut against its associated end stop.

In one or more embodiments, as has already been indicated above, the shaft has, to achieve a torque-prove engagement with the first and second barrel cams, a non-circular cross-section, and the first and second barrel cams have corresponding throughgoing openings having cross-sectional shapes complementary to the cross-section of the shaft, so that the first and second barrel cams are rotationally locked on the shaft, but slidable along the shaft.

In one or more embodiments, the first and second end stops are fixed to the shaft.

In one or more embodiments, the first and second end stops and the first and second barrel cams with the spring mechanism in-between are arranged such that the spring mechanism is under a predetermined preload and exerts oppositely directed forces on the first and second barrel cams to bias them against the first and second end stops, respectively. In other words, the arrangement of the first and second barrel cams with the spring mechanism in-between would expand on the shaft if one or both of the first and second end stops would be removed.

In one or more embodiments, the circumferentially extending end portion of each of the first and second cam grooves is continued by a cam groove section having a closed end and a slope opposite to the slope of the helical portion of the respective cam groove to form a detent end section of the respective cam groove to enable the respective one of the first and second cam followers to reach a stable end position at the closed end. In this way the risk that the cam followers and thus the driven member could leave the intended end position due to vibrations or other external interferences is minimized. For the sloping end section of the cam groove it is sufficient that the inner wall of the respective one of the first and second cam grooves, which inner wall separates the respective one of the first and second cam grooves from the respective recessed surface sector, is formed with such a slope.

In this connection, according to one or more embodiments, in the circumferential region of the closed end cam groove section of the first and second cam grooves, in the recessed surface sector of each of the first and second barrel cams a projecting surface is formed which is projecting away from the opposite one of the first and second barrel cams so that, when one of the first and second cam followers is reaching the detent end section of the respective one of a first and second cam grooves, the other one of the first and second cam followers is reaching and sliding along the projecting surface thereby pulling the one of the first and second cam followers in axial direction further into the closed end cam groove section to thereby enhance the detent effect in the first and second gear engaged end positions of the first and second barrel cams.

In one or more embodiments,, in each recessed surface portion of the first and second barrel cams a, wall of the respective point of the first and second cam grooves, which wall separates the respective one of the first and second cam groove from the recessed surface region, is in the helical portion of the respective one of the first and second cam grooves arranged such that its outer surface facing the recessed surface portion forms a further helical cam surface arranged such that after a predetermined angle of rotation of the first and second barrel cams, in case of a blocked driven component, the one of the first and second cam followers that during the rotation of the first and second barrel cams has left its associated one of the first and second cam grooves into the recessed surface portion slides onto the further helical cam surface and thereby drives the driven component further to overcome the blockage. In this manner it can be ensured that in case of a blocked driven component not only the spring mechanism is tensioned to store drive force, but also that eventually a further active drive force is exerted on the driven component as an attempt to actively overcome the blockage.

In this connection, according to one or more embodiments, the further helical cam surfaces in the recessed surface sectors of the first and second barrel cams are arranged such that the predetermined rotational angle from neutral at which additional drive force for the driven component is generated by the further helical cam surface is larger than the rotational angle that is required to let the helical portion of the first and second cam grooves pass the first and second cam followers, respectively.

In this manner it is ensured that the integrated drive force from the one of the first and second barrel cams is completely stored in the compressed spring mechanism before the further helical cam surface starts to actively add further drive force to the driven component in order to overcome the blockage.

In one or more embodiments, the width of the closed end sections of the first and second cam grooves is enlarged and larger than the width of the first and second cam followers, respectively, thereby establishing a free play for the driven component (4) relative to the first and second gear engaged positions, respectively.

In this connection, according to one or more embodiments, the axial distance between a circumferentially extending end surface section forming a continuation of the further helical cam surface and the opposing projecting surface in each of the first and second recessed surface sectors is larger than the width of the first and second cam followers, respectively, thereby establishing further free play for the driven component relative to the first and second gear engaged positions, respectively.

In one or more embodiments of the present application, a gear shift actuator with two oppositely oriented barrel cams which is capable of shifting from neutral in a first direction into a first gear engaged position, and from neutral in second direction opposite to the first direction into a second gear engaged position is described. However, it will be obvious to skilled persons that a simplified gear shift actuator with only a single barrel cam of this kind could also be realized to perform the same shift function for a single gear, i.e. a gear shift actuator using a single barrel cam and a spring between two spaced apart end stops to enable a pushrod to be driven from neutral to a gear engaged position and from there back to neutral.

DETAILED DESCRIPTION

Figure 3:
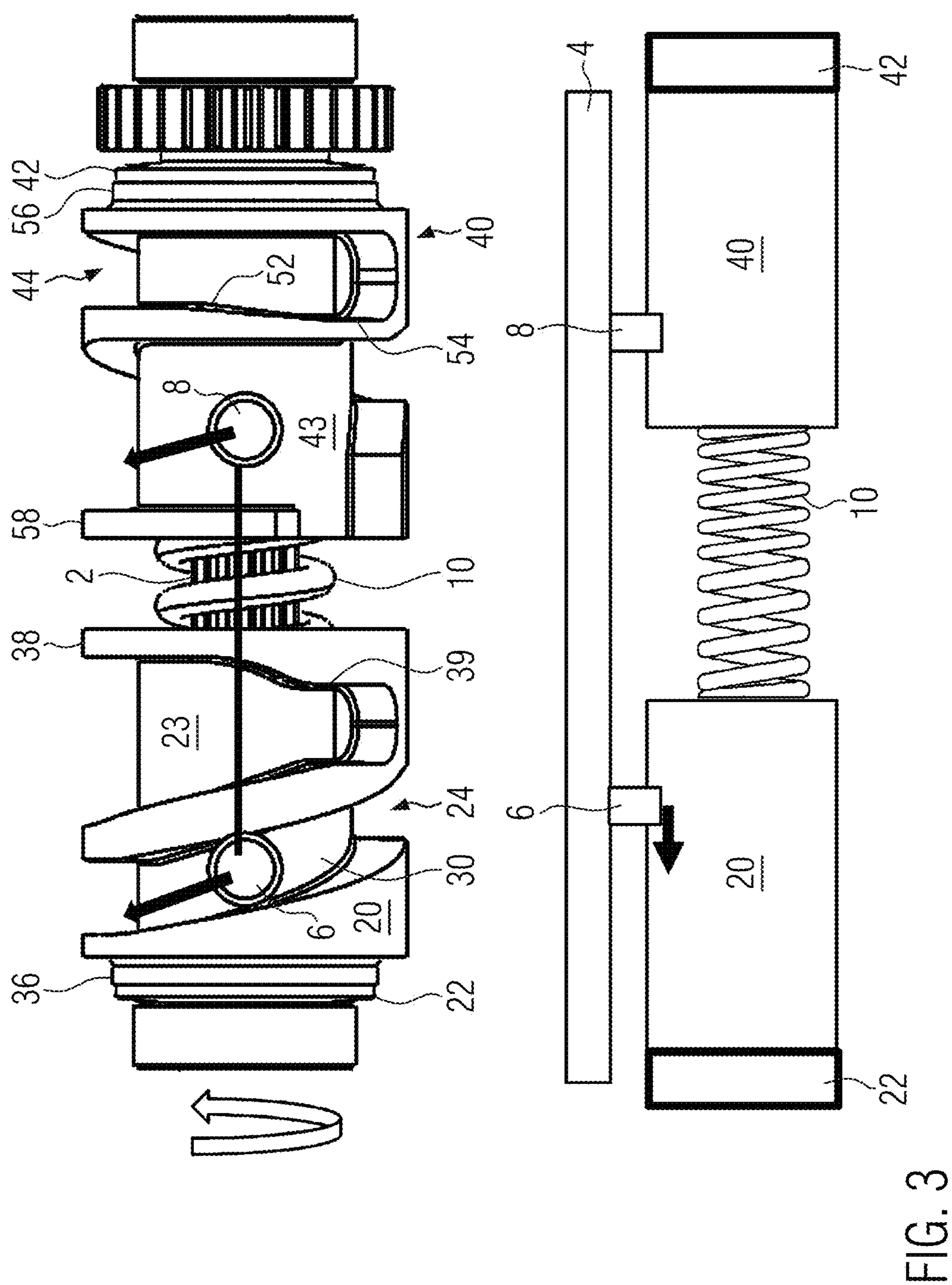
FIG. 3 shows a side view and below that a schematic view of the gear shift actuator when it is driven from a neutral to a first gear engaged position without any obstruction or blockage of the driven component.
Figure 4:
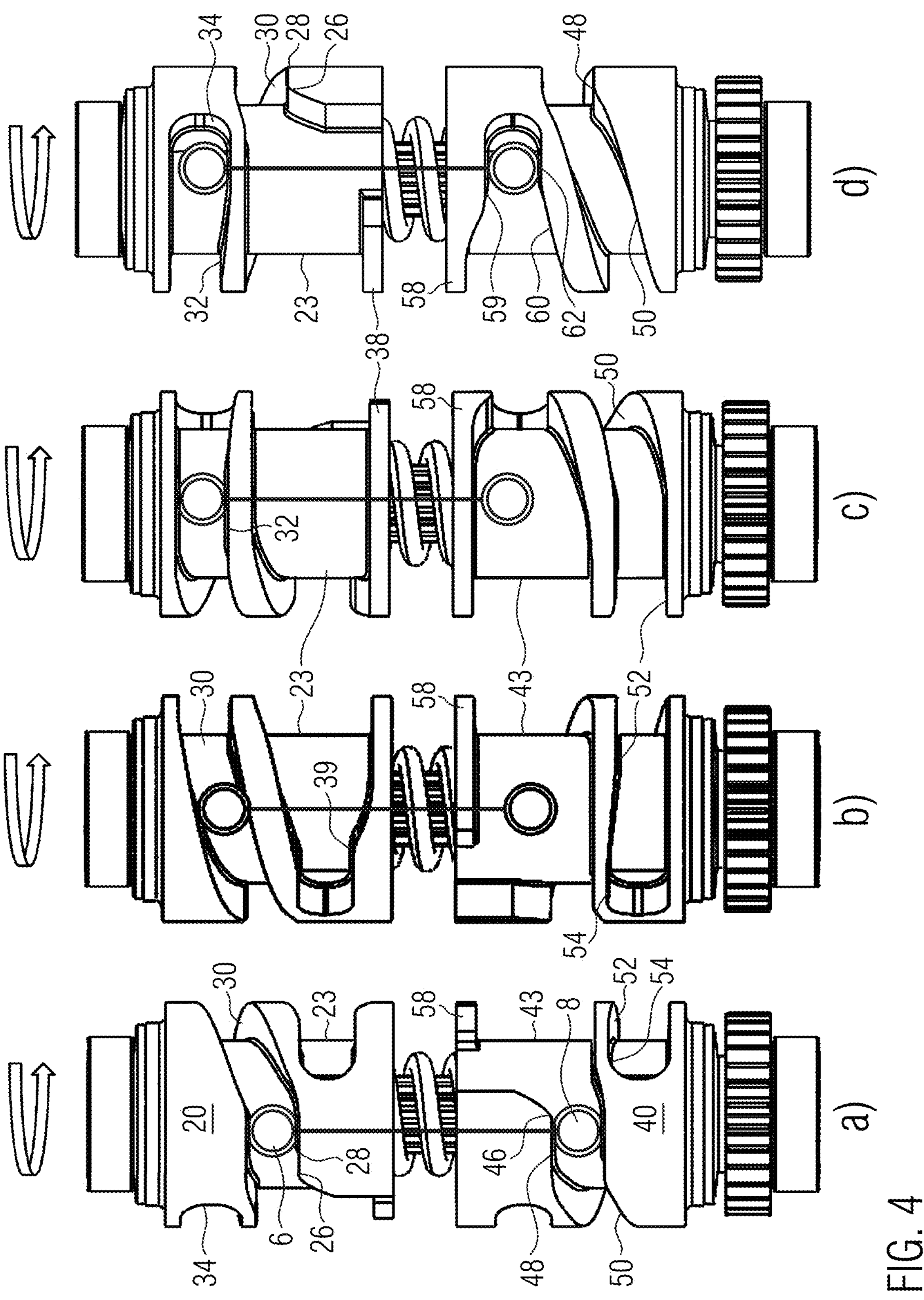
FIGS. 4*a*)-4*d*) show a sequence of rotational states of the gear shift actuator when it is driven from neutral to the first gear engaged position without obstruction.

It is noted that in most of the Figures illustrating the working principle of the gear shift actuator, such as FIGS. 3, 4(*a*)-4(*d*), 6(*a*)-6(*d*) etc., the cam followers 6, 8 are illustrated in a simplified manner as circles and the driven component 4 (pushrod) is simplified as a thick line connecting the first and second cam followers 6, 8.

Figure 1:
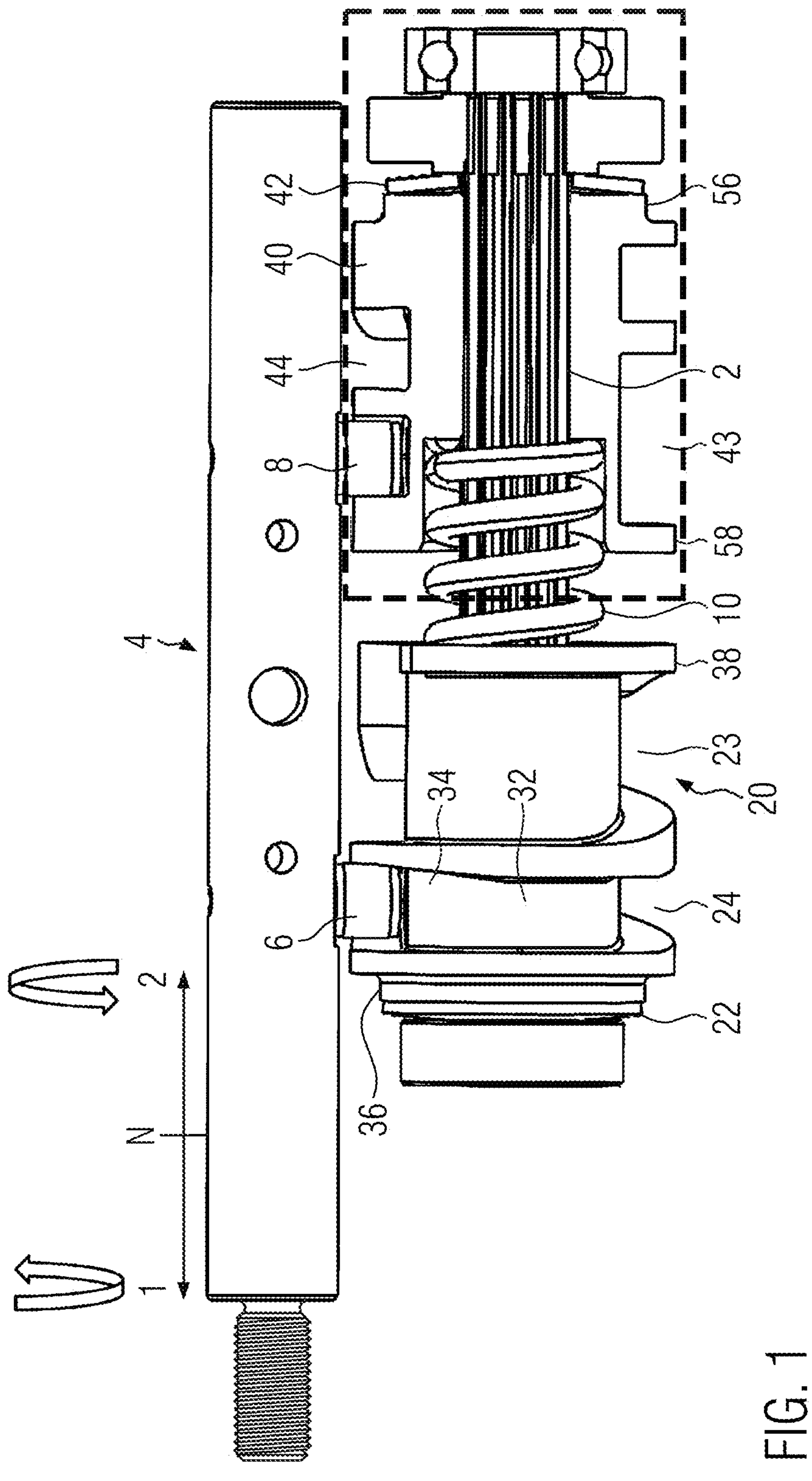
FIG. 1 shows, partly as a side view and partly in cross-section, a gear shift actuator.
Figure 2:
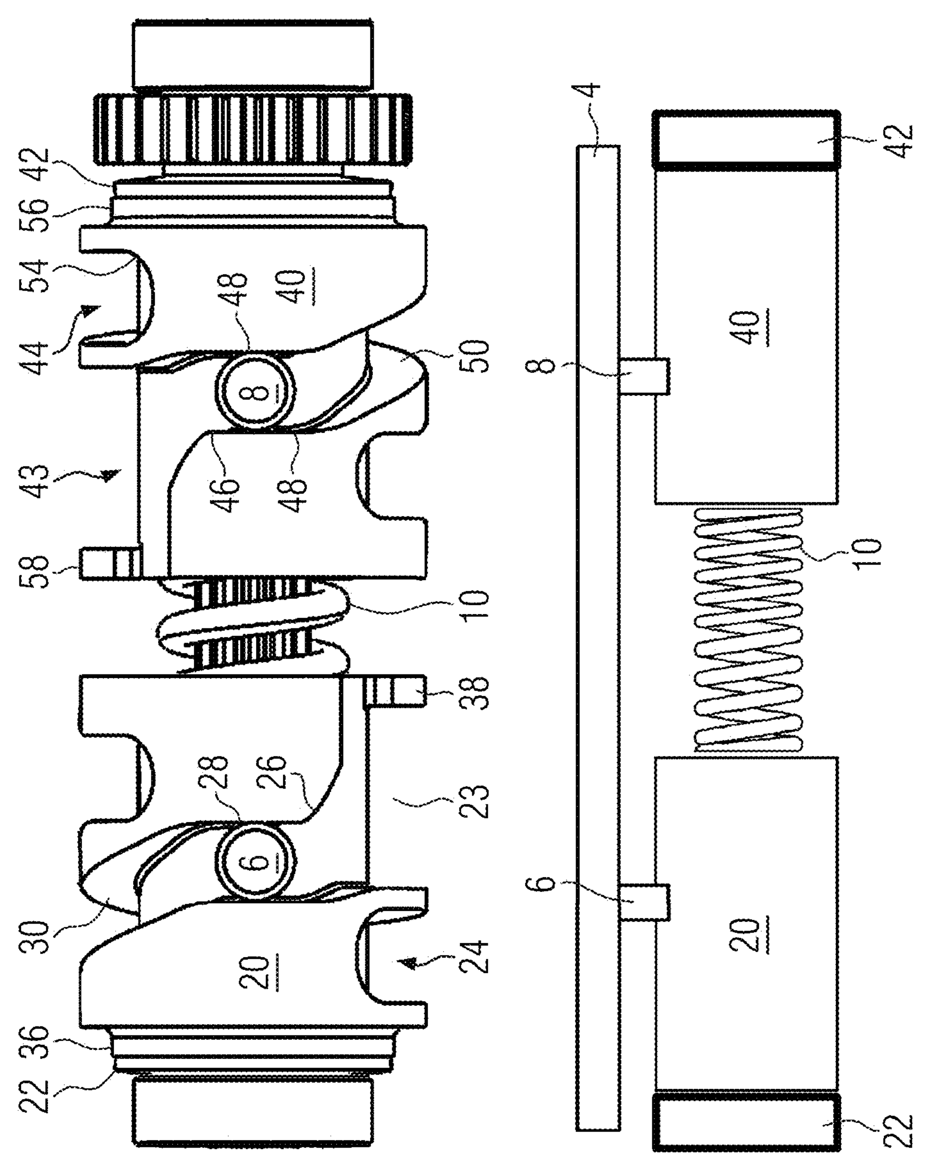
FIG. 2 shows a side view and below that a schematic view of the gear shift actuator.

With reference to FIGS. 1 and 2 an overview over the main components of the gear shift actuator and their arrangement will be given. The gear shift actuator comprises a rotary component 2 illustrated as a splined shaft, supported to be rotatable but unmovable in axial direction (unmovable with respect to the rest frame of the clutch (not shown) to be actuated), and on the right hand side of FIG. 1 ball bearings can be seen in cross-section which support the rotary member 2 in a rotatable manner. Next to the ball bearing a driven gear is illustrated which is driven by an electric motor (not shown) to rotate to thereby drive the rotary member 2 for rotation.

A driven component 4 is shown in FIG. 1, here in the form of a pushrod. The driven component 4 is provided with first and second cam followers 6, 8 which are aligned and spaced apart in axial direction. Above the pushrod a double arrow is shown with a N in the center to indicate a linear movement of the pushrod from a neutral position N in a first direction to a first gear engaged position 1 and from neutral N in a second direction to a second gear engaged position 2. Two spin arrows above the driven component 4 serve to illustrate that the linear movements in first and second direction are effected by rotating the rotary member in a first rotational direction and in a second rotational direction, respectively. However, as will become clear later, it should be noted that the gear shaft actuator is shown in FIG. 1 not in the neural position but with the driven component 4 in the first gear engaged position.

As shown in FIG. 2 the gear shift actuator has two oppositely oriented first and second barrel cams 20 and 40, i.e. the first and second barrel cams 20, 40 are of the same design, but are oriented in opposite directions which can be seen for example when looking at their first and second cam grooves 24, 44 which turn from starting points 26, 46 away in opposite directions towards outer end portions 36, 56 of the first and second barrel cams 20, 40.

In the following, in addition to FIG. 1 and, reference is also made to FIGS. 4*a*)-4*d*). The first (second) cam groove 24 (44) of the first (second) barrel cam 20 (40) starts from a starting point 26 (46) which is continued by a circumferentially extending start portion 28 (48). The circumferentially extending start portions 28, 48 are aligned in such a manner that they overlap in their angular extension about the rotational axis of the rotary member 2. This arrangement ensures that for a certain rotational movement range of the first and second barrel cams 20, 40 the first cam follower 6 is, after entering the first cam groove 24 through by passing the starting point 26, within the start portion 26 of the first cam groove, while the second cam follower 8 also is in the start portion 48 of the second cam groove 44. This arrangement ensures that, when the first and second barrel cams 20, 40 are rotated such that the first cam groove 24 is moving with the circumferentially extending start portion 28 along the first cam follower 6, the second cam groove 44 is moved along the circumferentially extending start portion 48 of the second cam groove 44 towards the starting point 46 and moved further such that the second cam follower 8 leaves the second cam groove 44 and enters a recessed surface sector 43 of the second barrel cam 40 before the first cam follower 6 reaches a helical portion 30 of the first cam groove. In the recessed surface sector 43 of the second barrel cam 40 the second cam follower 8 allows movement of the second barrel cam 40 in axial direction as long as the second cam follower 8 stays within the region between the second cam groove 44 and an inner end portion 58 of the second barrel cam 40.

The first (second) cam groove 24 (44) continues after the start portion 28 (48) with a helical portion 30 (50) which provides axial drive force for the first (second) cam follower 6 (8) for axial movement of the driven component 4. The helical portion 30 (50) of the first (second) cam groove 24, 44 is followed by a circumferentially extending end portion 32 (52). The end portion 32 (52) of the first (second) cam groove 24 (44) is terminated by a closed end section 34 (54) of the first (second) cam groove 24 (44). This closed end section 34 (54) has a closed end and is slightly sloping in an opposite sense to the helical portion 30 (50) of the first (second) cam groove 24 (44); in particular the slope may be formed by such a slope of the inner wall of the first (second) cam groove, as shown for the second cam groove by the sloping inner wall at 54 in FIG. 4*b*), and for the first cam groove by the sloping inner wall at 34 in FIG. 4*d*). Due to this slope of the closed end section 34 (54) the closed end section 34 (54) of the first (second) cam groove 24 (44) forms a detent end section to enable the first (second) cam follower 6 (8) to reach a stable end position at the end of the closed end section 34 (54).

This detent effect for the first cam follower 6 in the closed end section 34 is further supported by a projecting surface 59 which is formed in the circumferential region of the closed end section 34 in the recessed surface sector 43 of the second barrel cam 40 (see FIG. 4*d*)). When the first and second barrel cams 20, 40 are rotated such that the first cam follower 6 reaches the closed end section 34 of the first cam groove 24, the second cam follower 8 slides onto the projecting surface 59 which creates a driving force on the second cam follower 8 which pulls the first cam follower 6 to the bottom of the closed end section 34 of the first cam groove, thereby enhancing the detent effect when the first cam follower 6 reaches its end position (first gear engaged) to safely hold the cam followers 6, 8 in the end positions. Because of this detent mechanism the first cam follower 6 and the second cam follower are safely held in the first and second gear engaged end positions, respectively, even if vibrations or other external interferences act on the gear shift actuator.

Between the first and second barrel cams 20, 40 a spring mechanism 10 is disposed which is seated with its opposite ends in the facing inner end portions 38, 58 of the first and second barrel cams. The first and second barrel 20, 40 and the spring mechanism 10 are dimensioned such that the spring mechanism is under preload, i.e. exerts oppositely directed preload forces on the first and second barrel cams 20, 40 to bias them against spaced apart end stops 22, 42 which are fixed in axial direction to limit movement of the first and second barrel cams in axial direction. In this embodiment the first and second end stops 22, 42 are fixed to the rotary member 2, but they could in principle also be mounted on other components which are stationary in axial direction. It should be clear that the preload forces of the spring mechanism enhance the afore-mentioned detent effect of the first and second cam followers in the first and second gear engaged positions.

The drive principle of the gear shift actuator according to one or more embodiments is also illustrated in FIG. 3. FIG. 3 shows the first and second barrel cams 20, 40 when they have been rotated by the rotary member 2 such that the first cam follower is in the helical portion 30 of the first cam groove 24, while the second cam follower 8 of the driven component 4 is in the recessed surface sector 43 of the second barrel cam 40 such that the second cam follower 8 can follow the linear movement of the driven component in the first axial direction which is driven by rotating the helical portion 30 of the first barrel cam 20 with respect to the first cam follower 6 which is thereby driven to move in the first axial direction. It is noted here that the two arrows extending from the first and second cam followers 6, 8 indicate a relative movement of the cam followers 6, 8 relative to the first and second barrel cams 20, 40, wherein actually the first and second cam followers 6, 8 are at rest, while the first and second barrel cams 20, 40 are rotated relative to the first and second cam followers 6, 8.

In the lower part of FIG. 3 a rather schematic illustration of the gear shift actuator is shown which illustrates that the first barrel cam 20, when rotating with its helical portion 30 of the first cam groove along the first cam follower 6 generates a linear drive force on the first cam follower 6 and thereby on the driven component 4 to move in the first direction.

In the following the operation of the gear shift actuator will be described when it moves the driven component 4 from the neutral position to the first gear engaged position without experiencing any blockage, i.e. the driven component 4 is able to follow the movement of the first cam follower 6 under the driving force created by the rotation of the first barrel cam 20 with its helical portion 30 along the first cam follower 6.

In the state of FIG. 4*a*) the first and second barrel cams have already been rotated so that the starting point 26 of the first cam groove 24 already passed the first cam follower 6 which is close to the end of the circumferentially extending start portion 28 of the first cam groove 24, while the second barrel cam 40 has been rotated at the same time so that the start portion 48 of the second cam groove 44 is almost rotated away from the second cam follower 8 which is in FIG. 4*a*) in the state of passing through the starting point 46 of the second cam groove and into the recessed surface sector 43 of the second barrel cam 40.

When the first and second barrel cams 20, 40 are further rotated a helical portion 30 of the first cam groove 24 is moved along the first cam follower 6 which creates a driving force to move the first cam follower 6 in the first axial direction (in an upwards direction in FIG. 4*b*). At the same time the second cam follower 8 is able to follow the movement created by the first cam follower 6, wherein the second cam follower follows the movement in the first axial direction by a corresponding movement in the recessed surface sector 43 of the second barrel cam 40. Upon further rotation of the first and second barrel cams in the first rotational direction the circumferentially extending end portion 32 reaches the first cam follower 6 which terminates the axial movement phase (see FIG. 4*c*)).

Eventually, upon further rotation of the first and second barrel cams 20, 40 the first cam follower 6 reaches the closed end section 34 of the first cam groove 24 which has a slope towards the closed end which is opposite to the slope of the helical cam portion 30. At the same time the second cam follower 8 reached projecting surface 59 in the recessed surface sector 43 of the second barrel cam 40, and by sliding along a rising surface portion of the projecting surface 59 the second cam follower 8 exerts a force which pulls the first cam follower 6 to the bottom of the closed end section 34 to enhance the detent effect when the gear shift actuator reaches the first gear engaged position.

In the embodiment shown the projecting surface 59 has a circumferentially extending end portion. However, in principle the projecting surface 59 could also be shaped such that after a circumferentially extending portion an oppositely sloped end section with reduced projection height follows which would also create a detent depression to achieve a further detent effect.

Figure 5:
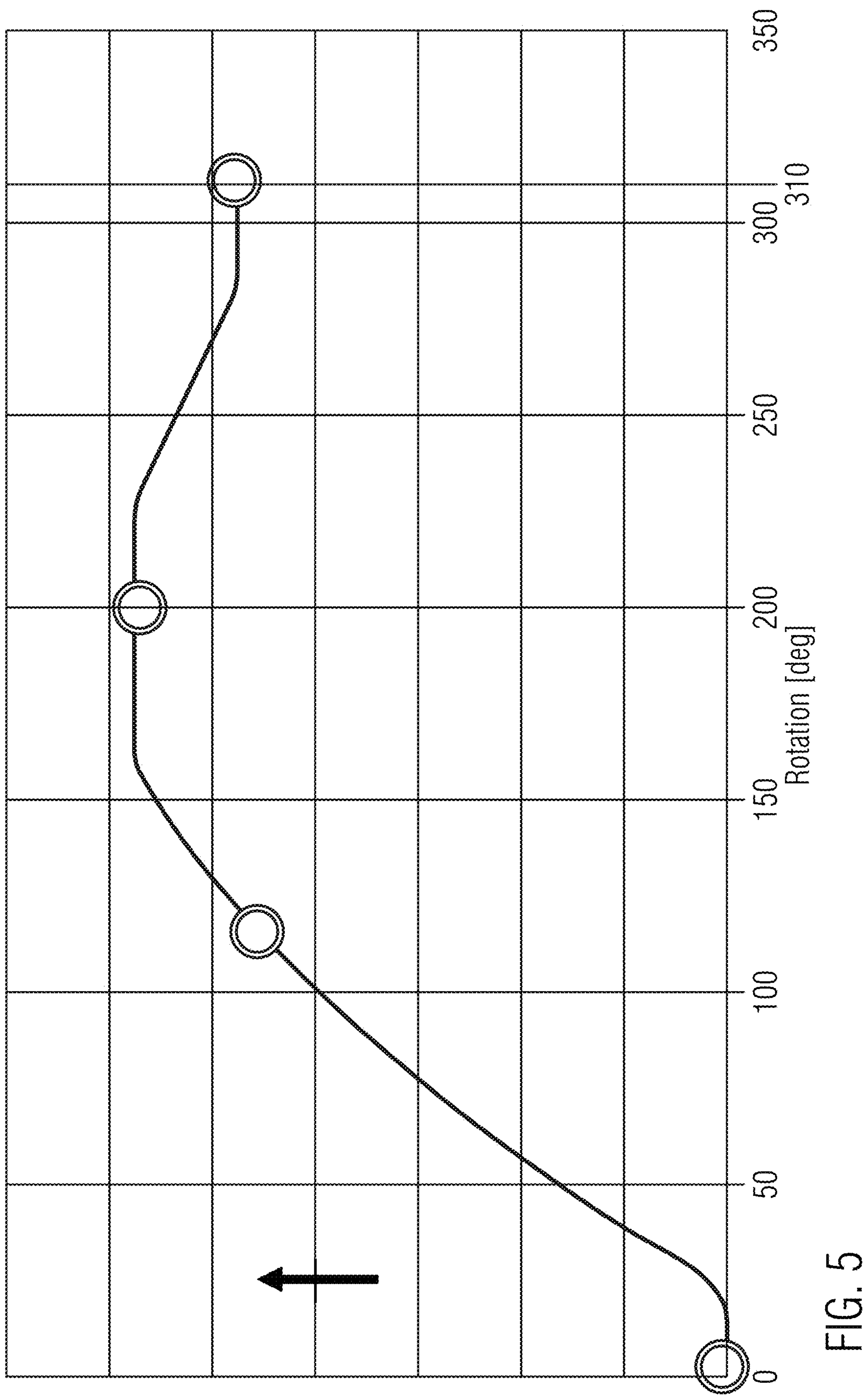
FIG. 5 is a diagram showing a cam follower movement (arbitrary units) as a function of the rotational angle during the operation of the gear shift actuator illustrated in FIGS. 4(*a*)-4(*b*)

FIG. 5 shows a diagram of the movement of the first cam follower from neutral to the first gear engaged position as a function of the rotation angle for the unobstructed operation of the gear shift actuator illustrated in FIGS. 4*a*)-4*d*). After a first rotational phase with no linear movement of the first cam follower 6 (the cam follower in this phase is in the circumferentially extending start portion 48 of the first cam groove) a steep linear rise of the shifted position of the first cam follower as a function of the rotational angle follows when the helical portion 30 of the first cam groove passes along the first cam follower which movement phase last up to a rotation angle of about 155°. In the following phase the circumferentially extending end portion 32 of the first cam groove 24 passes along the first cam follower which consequently is not moving anymore until a rotational angle of about 230° is reached, whereafter a slight backward movement of the first cam follower occurs, when the closed end section 34 of the first cam groove passes along the first cam follower 6 which has a slight slope opposite to the slope of the helical portion 30 of the first cam groove to create the above described detent effect at the gear engaged end position of the gear shift actuator.

Figure 6:
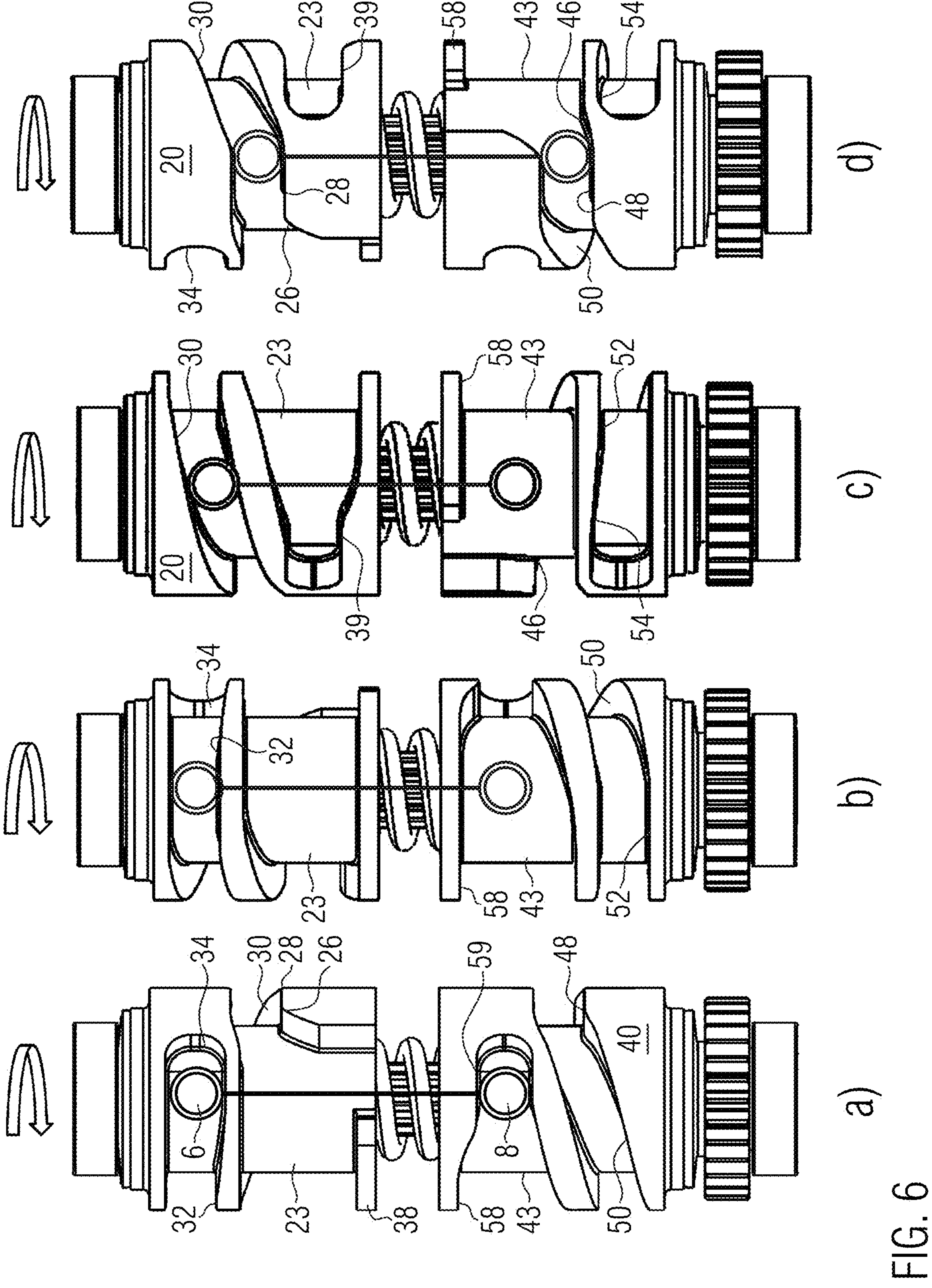
FIGS. 6*a*)-6*d*) show a sequence of rotational states of the gear shift actuator when it is driven from the first gear engaged position back to neutral.

With reference to FIGS. 6*a*)-6*d*) now the disengagement operation from the first gear engaged position to the neutral position will be described. In FIG. 6*a*) the rotation of the first and second barrel cams in the second rotational direction opposite to the first rotational direction (which was shown in FIGS. 4*a*)-4*d*)) has just begun so that the first cam follower 6 is in the phase of leaving the closed end section 34 of the first cam groove 24 while the second cam follower 8 is in the recessed surface sector 43 of the second barrel cam and slides along the projection surface 59. Upon further rotation the circumferentially extending end portion 32 of the first cam groove passes the first cam follower 6, as shown in FIG. 6*b*), while the second cam follower 8 is in the recessed surface sector 43 of the second barrel cam 40. With continuing rotation the helical portion 30 of the first cam groove is moving along the first cam follower 6 which causes a linear movement of the first cam follower 6 and consequently of the driven component in the second axial direction which is directed from the first gear engaged position to the neutral position (FIG. 6*c*)). Eventually, the circumferentially extending start portion 48 of the second cam groove reaches the second cam follower 8, while the first cam follower 6 has passed the helical portion 30 of the first cam groove (FIG. 6*d*)) and is about to enter the circumferentially extending start portion 28. After a brief phase of further rotation, when both of the first and second cam followers 6, 8 completely reached the circumferentially extending start portions 28, 48, respectively, the neutral position is reached.

Figure 7:
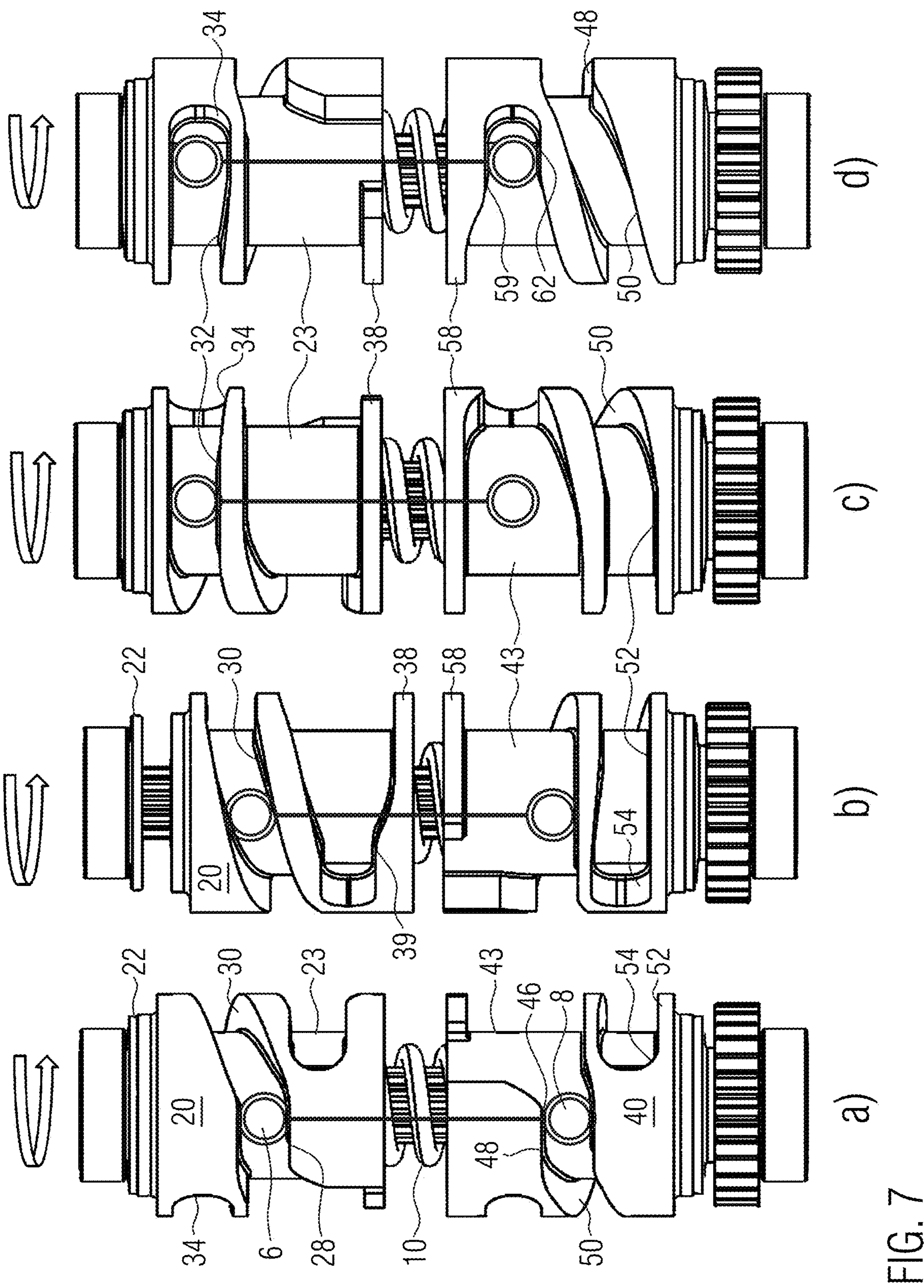
FIGS. 7*a*)-7*d*) show a sequence of rotational states of the gear shift actuator when it is driven from neutral towards first gear engaged position when the driven component is temporarily blocked during this driving operation.

In the following an operation scenario of the gear shift actuator is described in which the driven component experiences a temporary obstruction during the driving phase which is intended to move the driven component from the neutral to the first gear engaged position, wherein referenced made to FIGS. 7*a*)-7*d*) . In FIG. 7*a*) the first and second barrel cams 20, 40 just started rotation which brought the first cam follower 6 already close to the end of the circumferentially extending start portion 28 and close to the beginning of the helical portion 30 of the first cam groove, while the second cam follower is already close to the starting point 46 of the second cam groove and about to enter the recessed surface sector 43 of the second barrel cam. In FIG. 7*b*) the first and second barrel cams 20, 40 have been rotated further so that the first cam follower 6 is already in the middle of the helical cam portion 30 of the first cam groove while the second cam follower 48 is in the recessed surface sector 43 of the second barrel cam. Because the driven component is blocked in this case the driven component and consequently also the first and second cam followers 6, 8 cannot be driven for a linear movement in the first direction because of the blockage. Due to the blocked movement of the driven component and the cam followers the first barrel cam 20 has to compensate the passage of the first cam follower 6 through the helical cam portion 30 by a linear movement in the second direction which causes the first barrel cam 20 to be moved away from the associated first end stop 22 which causes a compression of the spring mechanism 10 because the first barrel cam has been moved closer to the second barrel cam (FIG. 7*b*) ). In other words, the blocked state of the driven component causes that the integrated driving force generated by rotation of the helical portion 30 of the first cam groove with respect to the first cam follower 6 is not transmitted into movement of the blocked driven component but stored in the compressed spring mechanism 10. In the scenario of FIGS. 7*a*)-7*d*) it is assumed that the blockage is released by itself at some point in time between the states of FIGS. 7*b*) and *c*). When the blockage is released the compressed spring mechanism 10 expands again and urges the first barrel cam 20 back to abut against the first end stop 22, wherein the expanding spring mechanism after release of the blockage makes up for the originally intended drive in the first direction during the blocked phase. After release of the blockage the final rotation to the first gear engaged end position corresponds to the unobstructed shift operation, and insofar reference can be made to the description in connection with FIG. 4*d*).

Figure 8:
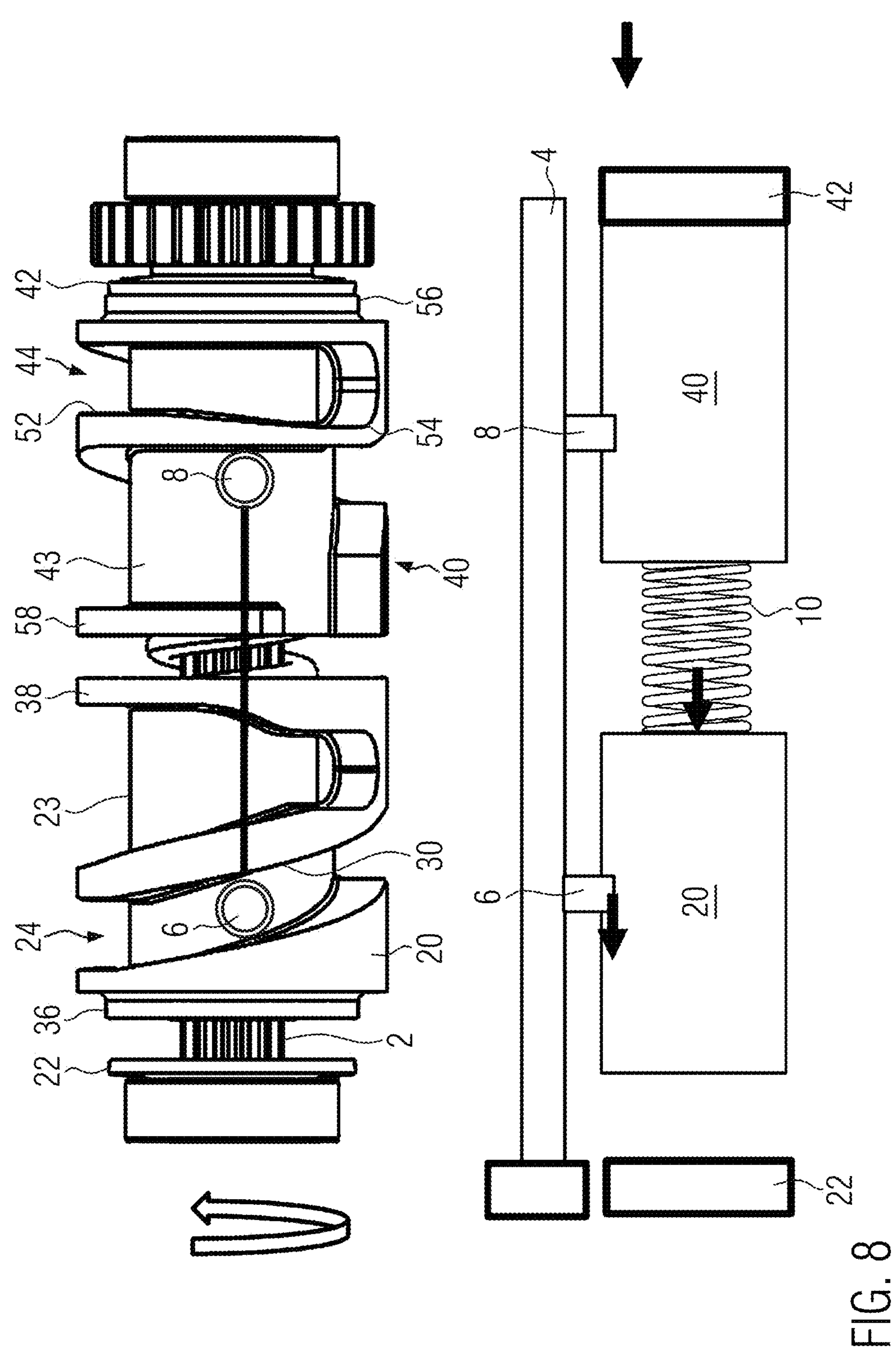
FIG. 8 is a side view and below that a schematic view of the gear shift actuator in a situation when the driven component is temporarily blocked during the driving operation.

The blocked state during the initial drive phase for the driven component in the first direction is also illustrated in FIG. 8 which shows the helical cam portion 30 already been moved along the first cam follower 6 about half way wherein the blocked state of the driven component and thus the first cam followers 6 forced the first barrel cam 20 to move opposite to the first direction in the second direction which moved the outer end portion 36 of the first barrel cam 20 away from the first end stop 22 and caused compression of the spring mechanism 10. In the lower part of FIG. 8 this situation is illustrated in a schematical manner, wherein the compressed state of the spring mechanism 10 is indicated by an arrow pointing from the spring mechanism 10 to the first barrel cam 20 as an indication of the additional compression force from the spring mechanism 10 which acts on the first barrel cam 20 and as a result via the first cam follower 6 on the driven component 4. If the blockage is now during or after the drive phase, when the helical portion 30 of the first cam groove 24 is moved along the first cam follower, released the expanding spring mechanism 10 makes up for the previously prevented movement of the driven component in the first direction, thereby bringing the first barrel cam 20 to the first gear engaged position.

Figure 9:
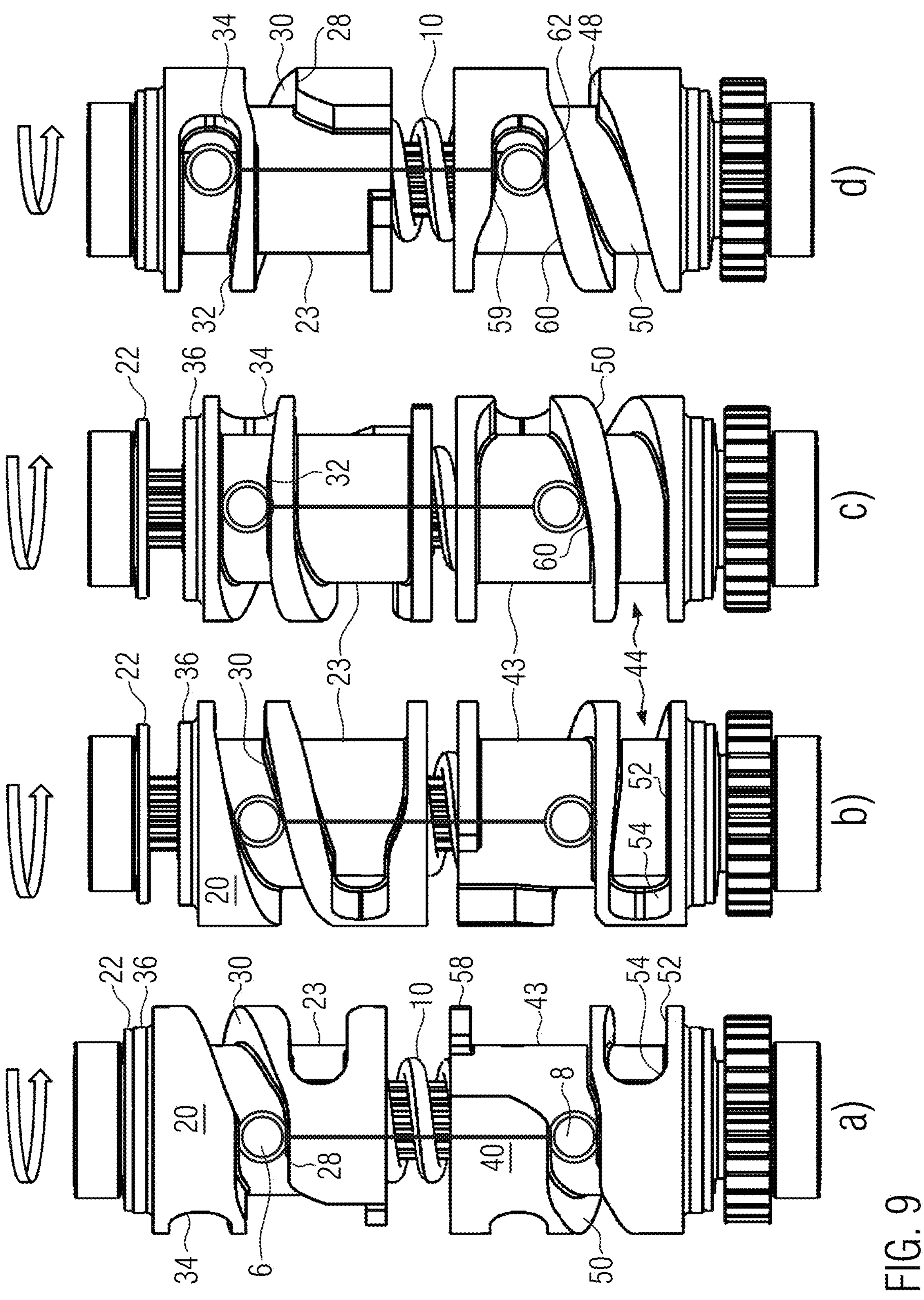
FIGS. 9*a*)-9*d*) show a sequence of rotational states of the gear shift actuator when the driven component is blocked and at a predetermined angle of rotation the driven component is actively driven in a stiff actuation mode to overcome the blockage.
Figure 10:
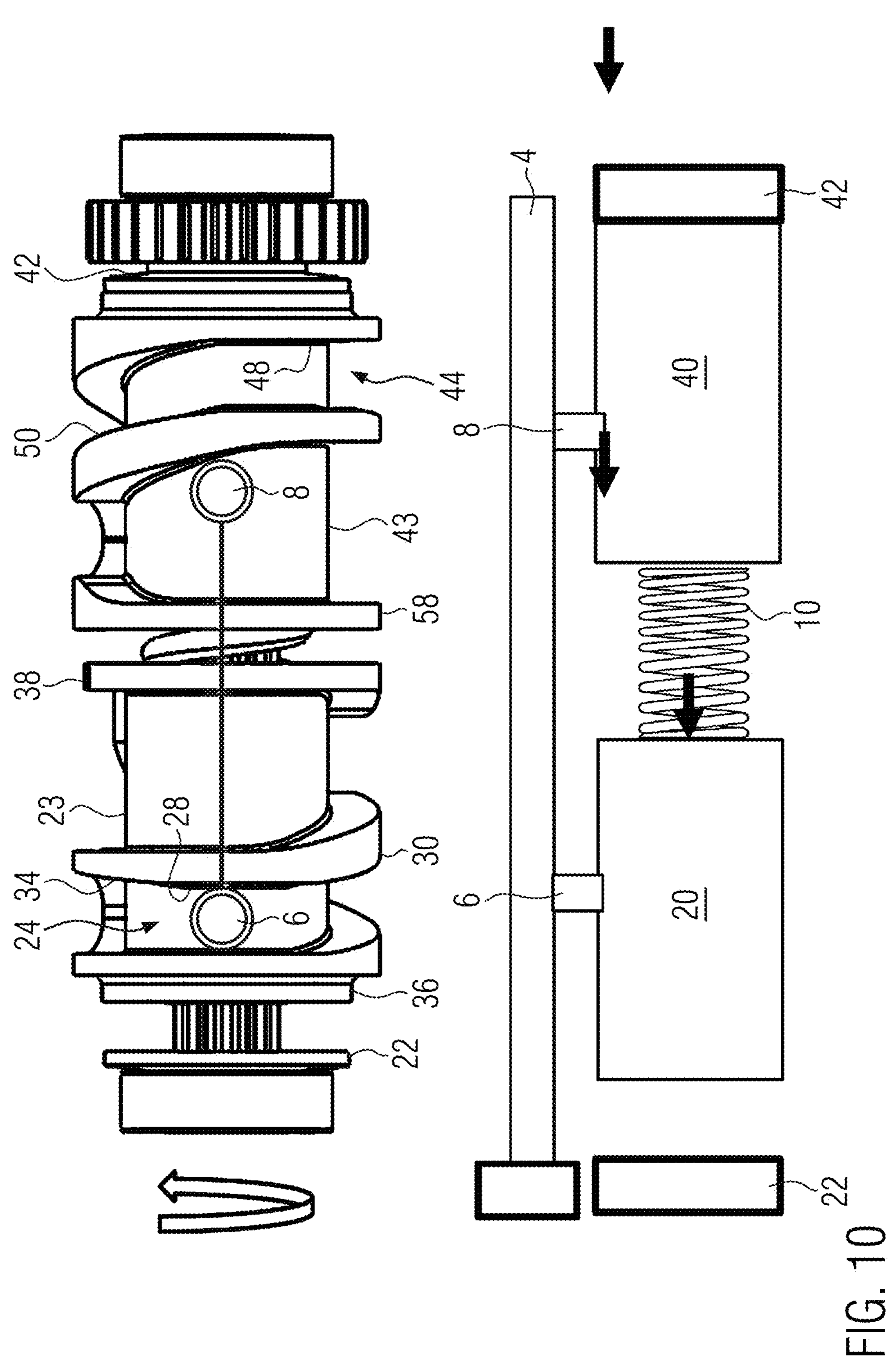
FIG. 10 is a side view and below that a schematic view of the gear shift actuator in the situation of FIGS. 9(*a*)-9(*d*), when the driven component after a predetermined angle of rotation is still blocked and the gear shift actuator is actively driving the driven component in a stiff actuation mode to overcome the blockage.

With reference to FIGS. 9*a*)-9*d*) now an operation scenario of the gear shift actuator will be described in which the blockage of the driven component is not released by itself but is continuing. In FIG. 9*a*) the beginning of the intended drive phase is almost reached, and the helical portion 30 of the first cam groove is close to reaching the first cam follower 6, while the second cam follower is about to enter the recessed surface sector 43 of the second barrel cam. Upon continued rotation of the first and second barrel cams 20, 40 the obstructed driven component forces the first barrel cam 20 again, as in FIG. 7*b*), to move in the second direction towards the second barrel cam 40, thereby compressing the spring mechanism 10.

In FIG. 9*c*) the rotation of the first and second barrel cams 20, 40 continued so that the first cam follower 6 is already in the end portion 32 of the first cam groove, while the second cam follower 8 now becomes effective in the following manner. In the recessed surface sector 43 of the second barrel cam 40 a wall of the second cam groove 44, which is the wall separating the second cam groove 44 from the recessed surface sector 43, is in the helical portion 50 of the second cam groove 44 arranged such that its outer surface facing the recessed surface sector 43 forms a further helical cam surface 60 such that after a predetermined angle of rotation, in the state of FIG. 9*c*), the second cam follower 8 slides onto the further helical cam surface 60 which upon further rotation of the second barrel cam 40 thereby actively drives the driven component 4 with additional force in the first direction in an attempt to overcome the blockage. In the scenario illustrated in FIGS. 9*a*)-9*d*) it is assumed that due to this further push by the further helical cam surface providing additional drive force for the driven component the blockage is overcome, whereafter the spring mechanisms 10 expands to bring the first barrel cam 20 back into abutment against the first end stop 22 (FIG. 9*d*) ), whereafter rotation continues for a last rotation phase until the first and second cam followers 6, 8 have reached their stable end position (first gear engaged) as illustrated in FIG. 4*d*) and as described with reference to FIG. 4*d*).

As can be seen in FIG. 4*d*) the further helical cam surface 60 is continued by a circumferentially extending surface end section 62. The second cam follower reaches the gap between the circumferentially extending surface end section 62 and the opposing projecting surface 59 when the gear shift actuator approaches the first gear engaged position as shown in FIG. 4*d*).

Figure 11:
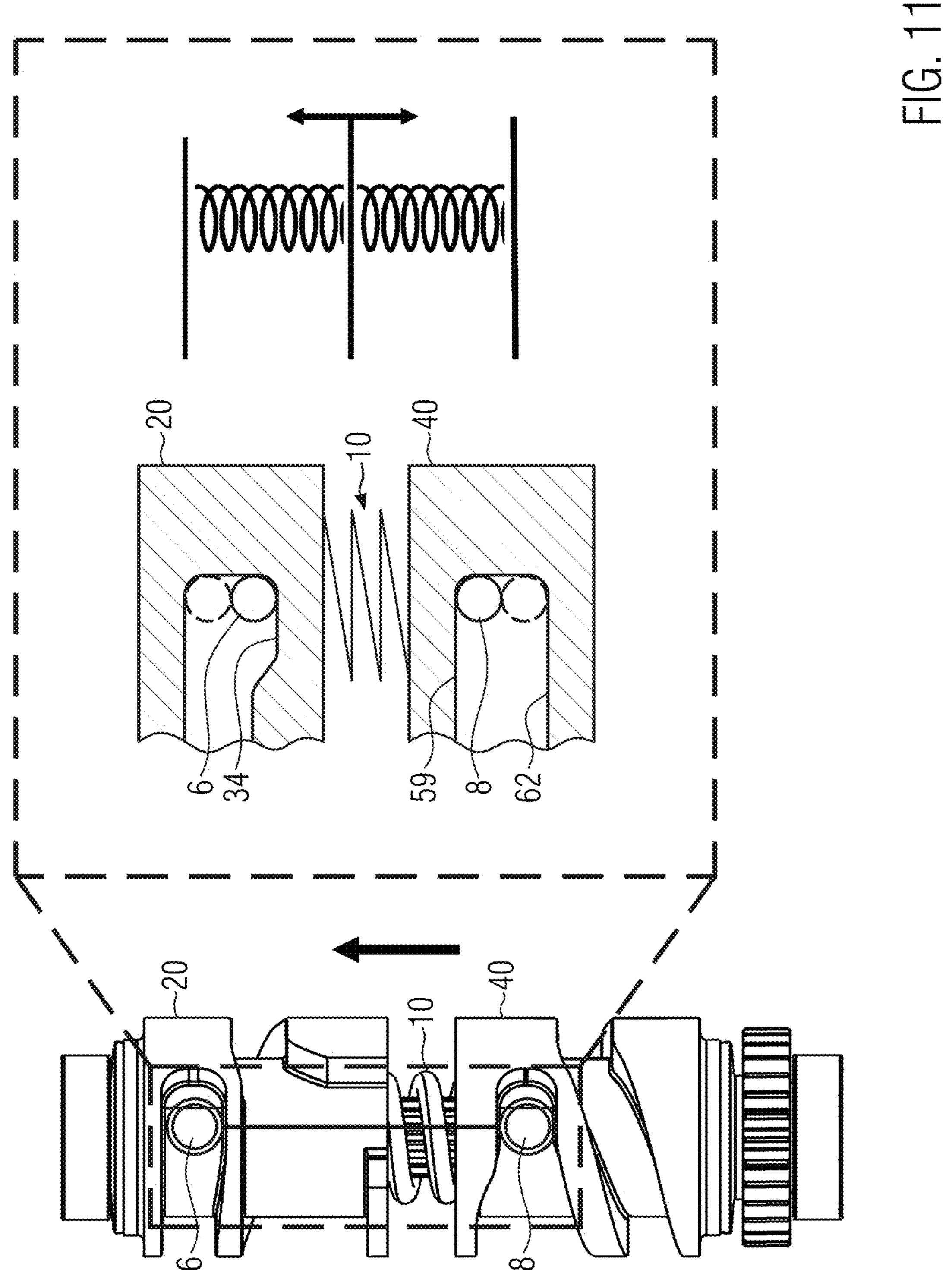
FIG. 11 is a schematic side view of the linear drive assembly together with an enlarged detail in cross-section.

In FIG. 11 a side view of the gear shift actuator is shown in schematic manner, wherein the gear shift actuator is in the first gear engaged position, the first cam follower 6 being in the closed end section 34 of the first cam groove and the second cam follower 8 being located in the gap between the projecting surface 59 of the second barrel cam 40 and the circumferentially extending end surface section 62 which is forming a continuation of the further helical cam surface 60 in the recessed surface sector 43 of the second barrel cam 40. In the middle of FIG. 11 an enlarged detail is shown in a rather schematic manner, namely the closed end section 34 of the first barrel cam 20 and below that the space formed in the gap between the projecting surface 59 formed in the recessed surface sector 43 and the opposite circumferential surface section 62 following on the further helical cam surface 60 in the recessed surface sector of the second barrel cam 40. With reference in particular to this schematic detail in FIG. 11 the detent mechanism which keeps the gear shift actuator in the currently engaged gear position will now be described.

Under normal conditions, when the gear shift actuator is in the first gear engaged position as shown in the middle in FIG. 11, the preload of the spring mechanism 10 urges the first barrel cam 20 and the second barrel cam 40 apart so that the first cam follower 6 and the second cam follower 8 are in the positions indicated by the full circles in the detail in the middle of FIG. 11. As shown, the first cam follower 6 and the second cam follower 8 have some free play in axial direction in their respective positions between the opposing surfaces in the first barrel cam 20 and the second barrel cam 40. If some external force is acting on the pushrod trying to pull the push rod out of the first gear engaged position towards neutral, this force has to overcome the preload of the spring mechanism, thereby pulling the first barrel cam 20 closer to the second barrel cam 40. If such force is acting on the pushrod and pulls the first barrel cam 20 closer to the second barrel cam 40 the second cam follower 8 will be displaced by the same distance in the gap of the second barrel cam 40. Eventually the second cam follower 8 will contact the circumferential surface end section 62 which forms a hard stop so that the push rod cannot be pulled any further away from the first gear engaged position towards neutral. This position of the second cam follower 8 is schematically indicated by the dashed line circle. Any further displacement of the push rod from the close neighborhood of the first gear engaged position is thus in any case prevented (the extent of this neighborhood is determined by the degree of free play of the cam followers in axial direction in the described positions).

As soon as the interfering force on the pushrod stops to act on the pushrod the additional compression of the spring mechanism 10 will be released by expansion of the spring mechanism 10 so that the pushrod with its first and second cam followers 6, 8 again reaches the position as indicated by the cam followers 6, 8 in full circles, which corresponds to the first gear engaged position of the pushrod.

The same operation principle applies when the gear shift actuator is in the second gear engaged position and an interfering force is trying to pull the push rod out of the second gear engaged position towards neutral. Then the second barrel cam 40 will be pulled closer to the first barrel cam 20 to follow the movement of the push rod away from the second gear engaged position. Such movement of the push rod pulling the second barrel cam 40 closer to the first barrel cam 20 then reaches a hard end stop when the first cam follower 6, due to the displacement of the push rod, reaches the opposite wall of the closed end section 34 of the first cam groove, as indicated by the dashed line circle.

From the description of the design and the operation of the detent mechanism as described above for an interfering force directed such that it attempts to pull the pushrod out of the gear engaged position towards neutral, it is clear that the same functionality is achieved for an interfering force directed such that it attempts to push the pushrod further into and beyond the respective gear engaged position, which will also result in reaching a hard end stop when the free play of the cam followers has been used up, which prevents further compression of the spring mechanism and thereby prevents any further movement of the pushrod away from the gear engaged position; when the interfering force ceases to act on the pushrod the expanding spring mechanism moves the pushrod back to the gear engaged position.

The spring and lines diagram on the right hand side of FIG. 11 illustrates the described detent function with the hard end stops as described indicated by an upper full line and a lower full line, wherein in-between there is a spring-loaded zone which allow movement of the push rod out of the first gear engaged position to a certain extent towards neutral or in the opposite direction, but in any case limited by one of the two hard stops. The diagram on the right hand side in FIG. 11 shows two opposite horizonal lines, springs in-between, and a horizontal central line. The vertical axis represents the displacement of the pushrod from the first gear engaged position (indicated by the central line), wherein the upper full line indicates the hard stop when the force is trying to pull the pushrod out of the first gear engaged position, the lower full line indicates the hard stop when the force is trying to push the pushrod further into and beyond the first gear engaged position, and the central full line represents the rest state of the pushrod (with no interfering force acting on it) in the first gear engaged position. This spring biased detent mechanism ensures that the pushrod is retained in the region between the two hard stops indicated by the upper and lower full line, and is always returned to the original engaged gear position (indicated by the central horizontal line) as soon as the interfering force on the pushrod ceased.

It is noted here that in the previous Figures, such as FIG. 4(*a*)-4(*d*), 7(*a*)-7(*d*) or 9(*a*)-9(*d*), the space between the circumferential surface end section 62 and the projecting surface 59 is shown in such a manner as if there is no free play for the second cam follower in axial direction, but this is only for simplifying the illustrations. In principle, the free play as explained here in connection with FIG. 11 can also be realized in the embodiment shown in the remaining Figures such as FIGS. 4(*a*)-4(*d*), 6(*a*)-6(*d*), 7(*a*)-7(*d*) and 9(*a*)-9(*d*).

As a general comment it is noted that in the present description the main focus was on describing the operation of the gear shift actuator for shifting from neutral to first gear engaged position and back to neutral. The opposite shift operation from neutral to second gear engaged position is not described in detail here, but it should be apparent that this operation works in the same manner as described herein in the opposite direction with the roles of the first and second barrel cams 20, 40 interchanged when the gear shift actuator is shifting from neutral to second gear engaged position and back to neutral.

The invention claimed is:

1. A gear shift actuator comprising:

a linear drive assembly comprising:

a driven component configured to actuate a shift fork;

a rotary member which is supported to be rotatable, but unmovable in an axial direction defined by its a rotary axis of the rotary member; and an electric motor configured to rotate the rotary member, wherein the driven component is driven by rotary movement of the rotary member for linear movement parallel to the axial direction in a first direction from a neutral position to a first gear engaged position and back to neutral, when the rotary member is driven to rotate first in a first rotational direction and then in a second rotational direction opposite to the first rotational direction, and in a second direction opposite to the first direction from the neutral position to a second gear engaged position and back to neutral, when the rotary member is first driven to rotate in the second rotational direction and then in the first of rotational direction, wherein the rotary member is a shaft, wherein first and second barrel cams are configured engage with the shaft in a torque-proof manner while being slidable in axial direction along the shaft, and wherein the first and second barrel cams are disposed between spaced apart first and second end stops which are fixed in axial direction to limit axial movement of the first and second barrel cams, respectively, wherein a spring mechanism is disposed between the first and second barrel cams to bias the first and second barrel cams apart and towards the first and second end stops, respectively, wherein the first and second barrel cams comprise first and second cam grooves on surfaces thereof, respectively, wherein the driven component carries first and second cam followers spaced apart and aligned in axial direction and arranged to be received in the first and second cam grooves, respectively, wherein each of the first and second cam grooves extends from a starting point along a circumferential start portion, followed by a helical portion extending further towards an outer end portion of the respective one of the first and second barrel cams, which is followed by a circumferentially extending end portion, wherein the starting points of the first and second cam grooves are open to recessed surface sectors of the first and second barrel cams, respectively, which allow movement of the first and second cam followers, respectively, in a direction parallel to the axial direction in a region between the first and second cam grooves, respectively, and an inner end portion of the first and second barrel cams remote therefrom, and wherein the first and second barrel cams are rotationally oriented with respect to each other such that the start portions of the first and second cam grooves are aligned so that, when the first cam follower is in the start portion of the first cam groove, the second cam follower is in the start portion of the second cam groove, so that when the rotary member is then rotated in the first of rotational direction, the first cam groove is moved along the first cam follower which thereby is driven by the helical portion to move the driven component in the first direction, while the second cam follower is free to follow the movement in the recessed surface sector of the second barrel cam, is rotated in the second rotational direction, the second cam groove is moved along the second cam follower which thereby is driven by the helical portion to move the driven component in the second direction, while the first cam follower is free to follow the movement in the recessed surface sector of the first barrel cam.

2. The gear shift actuator according to claim 1, wherein the shaft has a non-circular cross-section and is received in throughgoing openings of the first and second barrel cams, the openings having cross-sectional shapes complementary to the non-circular cross-section of the shaft.

3. The gear shift actuator according to claim 1, wherein the first and second end stops are fixed to the shaft.

4. The gear shift actuator according to claim 1, wherein the distance between the first and second end stops and the first and second barrel cams with the spring mechanism in between are arranged such that the spring mechanism is under a predetermined preload and exerts oppositely directed forces on the first and second barrel cams to bias them against the first and second end stops, respectively.

5. The gear shift actuator according to claim 1, wherein the circumferentially extending end portion of each of the first and second cam grooves is continued by a closed end cam groove section which has a slope opposite to the slope of the helical cam groove portion to form a detent end section to enable the respective one of the first and second cam followers to reach a stable end position.

6. The gear shift actuator according to claim 5, wherein, in the circumferential region of the closed end cam groove section of the first and second cam grooves, in the recessed surface sectors of each of the first and second barrel cams, a projecting surface is formed projecting away from the opposite one of the first and second barrel cams so that, when one of the first and second cam followers reaches the closed end cam groove section of the respective one of the first and second cam grooves, the other one of the first and second cam followers reaches and slides along the projecting surface so that the other one of the first and second cam followers is pulling pulls the one of the first and second cam followers in axial direction into the closed end cam groove section to enhance the detent effect in the first and second gear engaged end positions of the first and second barrel cams.

7. The gear shift actuator according to claim 1, wherein, in each recessed surface sector of the first and second barrel cams, a wall of the respective one of the first and second cam grooves, that separates the respective one of the first and second cam grooves from the recessed surface sector, is in the helical portion of the respective one of the first and second cam grooves arranged such that an outer surface thereof facing the recessed surface sector forms a further helical cam surface such that, after a predetermined angle of rotation of the first and second barrel cams, in case of a blocked driven component, the one of the first and second cam followers that, during the rotation of first and second barrel cams, has left its an associated one of the first and second cam grooves into the recessed surface sector slides onto the further helical cam surface and thereby drives the driven component to overcame the blockage.

8. The gear shift actuator according to claim 7, wherein the further helical cam surfaces in the recessed surface sectors of the first and second barrel cams are arranged such that the predetermined rotational angle from neutral at which additional drive force for the driven component is generated by the further helical cam surface is larger than the rotational angle that is required to let the helical portion of the first and second cam grooves pass the first and second cam followers, respectively.

9. The gear shift actuator according to claim 1, wherein the width of the closed end sections of the first and second cam grooves is enlarged and larger than the width of the first and second cam followers, respectively, thereby establishing a free play for the driven component relative to the first and second gear engaged positions, respectively.

10. The gear shift actuator according to claim 9, wherein an axial distance between a circumferentially extending end surface section forming a continuation of the further helical cam surface and the opposing projecting surface in each of the first and second recessed surface sectors is larger than the width of the first and second cam followers, respectively, thereby establishing further free play for the driven component relative to the first and second gear engaged positions, respectively.

11. The gear shift actuator according to claim 1, wherein the shaft is a splined shaft.

12. The gear shift actuator according to claim 2, wherein the first and second end stops are fixed to the shaft.

13. The gear shift actuator according to claim 2, wherein the distance between the first and second end stops and the first and second barrel cams with the spring mechanism in between are arranged such that the spring mechanism is under a predetermined preload and exerts oppositely directed forces on the first and second barrel cams to bias them against the first and second end stops, respectively.

14. The gear shift actuator according to claim 3, wherein the distance between the first and second end stops and the first and second barrel cams with the spring mechanism in between are arranged such that the spring mechanism is under a predetermined preload and exerts oppositely directed forces on the first and second barrel cams to bias them against the first and second end stops, respectively.

15. The gear shift actuator according to claim 2, wherein the circumferentially extending end portion of each of the first and second cam grooves is continued by a closed end cam groove section which has a slope opposite to the slope of the helical cam groove portion to form a detent end section to enable the respective one of the first and second cam followers to reach a stable end position.

16. The gear shift actuator according to claim 3, wherein the circumferentially extending end portion of each of the first and second cam grooves is continued by a closed end cam groove section which has a slope opposite to the slope of the helical cam groove portion to form a detent end section to enable the respective one of the first and second cam followers to reach a stable end position.

17. The gear shift actuator according to claim 4, wherein the circumferentially extending end portion of each of the first and second cam grooves is continued by a closed end cam groove section which has a slope opposite to the slope of the helical cam groove portion to form a detent end section to enable the respective one of the first and second cam followers to reach a stable end position.

18. The gear shift actuator according to claim 1, wherein, in each recessed surface sector of the first and second barrel cams, a wall of the respective one of the first and second cam grooves that separates the respective one of the first and second cam grooves from the recessed surface sector is in the helical portion of the respective one of the first and second cam grooves arranged such that an outer surface thereof facing the recessed surface sector forms a further helical cam surface such that, after a predetermined angle of rotation of the first and second barrel cams, in case of a blocked driven component, the one of the first and second cam followers that, during the rotation of first and second barrel cams, has left an associated one of the first and second cam grooves into the recessed surface sector slides onto the further helical cam surface and thereby drives the driven component to overcame the blockage.

19. The gear shift actuator according to claim 2, wherein, in each recessed surface sector of the first and second barrel cams, a wall of the respective one of the first and second cam grooves that separates the respective one of the first and second cam grooves from the recessed surface sector is in the helical portion of the respective one of the first and second cam grooves arranged such that an outer surface thereof facing the recessed surface sector forms a further helical cam surface such that, after a predetermined angle of rotation of the first and second barrel cams, in case of a blocked driven component, the one of the first and second cam followers that, during the rotation of first and second barrel cams, has left an associated one of the first and second cam grooves into the recessed surface sector slides onto the further helical cam surface and thereby drives the driven component to overcame the blockage.

20. The gear shift actuator according to claim 3, wherein, in each recessed surface sector of the first and second barrel cams, a wall of the respective one of the first and second cam grooves that separates the respective one of the first and second cam grooves from the recessed surface sector is in the helical portion of the respective one of the first and second cam grooves arranged such that an outer surface thereof facing the recessed surface sector forms a further helical cam surface such that, after a predetermined angle of rotation of the first and second barrel cams, in case of a blocked driven component, the one of the first and second cam followers that, during the rotation of first and second barrel cams, has left an associated one of the first and second cam grooves into the recessed surface sector slides onto the further helical cam surface and thereby drives the driven component to overcame the blockage.

* * * * *